US009113427B2

(12) United States Patent
Attar et al.

(10) Patent No.: US 9,113,427 B2
(45) Date of Patent: Aug. 18, 2015

(54) SYSTEMS, APPARATUS, AND METHODS FOR MITIGATING TRANSMITTER INDUCED DESENSE

(71) Applicant: Qualcomm Incorporated, San Diego, CA (US)

(72) Inventors: Rashid Ahmed Akbar Attar, San Diego, CA (US); Troy Russell Curtiss, Erie, CO (US); Ammar Taiyebi Kitabi, San Diego, CA (US); Chintan Shirish Shah, San Diego, CA (US); Athreya Prasad, San Diego, CA (US); Sunil Rajendran, San Diego, CA (US); Ramchandran Srinivasan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 101 days.

(21) Appl. No.: 13/708,184

(22) Filed: Dec. 7, 2012

(65) Prior Publication Data

US 2014/0161048 A1 Jun. 12, 2014

(51) Int. Cl.
*H04W 4/00* (2009.01)
*H04W 52/36* (2009.01)
*H04W 52/24* (2009.01)

(52) U.S. Cl.
CPC ............ *H04W 52/36* (2013.01); *H04W 52/243* (2013.01)

(58) Field of Classification Search
CPC ...... H04W 72/04; H04W 88/08; H04W 76/00
USPC ........................................................ 370/329
See application file for complete search history.

(56) References Cited

U.S. PATENT DOCUMENTS

| 8,027,673 B2 | 9/2011 | Rolf et al. |
| 8,175,630 B2 | 5/2012 | Cairns |
| 2009/0149140 A1* | 6/2009 | Borran et al. ............... 455/114.2 |
| 2010/0120446 A1* | 5/2010 | Gaal .......................... 455/452.2 |
| 2011/0312288 A1 | 12/2011 | Fu et al. |

FOREIGN PATENT DOCUMENTS

| EP | 1587222 A2 | 10/2005 |
| WO | 2010038094 A1 | 4/2010 |
| WO | WO-2010054364 | 5/2010 |

OTHER PUBLICATIONS

International Search Report and Written Opinion—PCT/US2013/073702—ISA/EPO—Feb. 21, 2014.
Zhu J., et al., "Multi-Radio Coexistence: Challenges and Opportunities", Computer Communications and Networks, 2007. ICCCN 2007. Proceedings of 16th International Conference on, IEEE, PI, Aug. 1, 2007, pp. 358-364, XP031136890.

* cited by examiner

*Primary Examiner* — Afshawn Towfighi
(74) *Attorney, Agent, or Firm* — Liberty E. Mann

(57) ABSTRACT

This disclosure provides systems, methods, and apparatus for mobile transmit diversity. In one aspect a method of controlling a transmit power level of a wireless communications apparatus is provided. The method includes adjusting the transmit power level of a transmitter of the wireless communications apparatus to a first transmit power level in response to detecting a de-sense event indicative of interference with a signal received by a receiver of the wireless communications apparatus due to emissions from the transmitter. The method further includes maintaining the transmit power level substantially at the first transmit power level for a first time interval in response to adjusting the transmit power level to the first transmit power level. The method further includes adjusting a transmit power level limit of the transmitter after the time interval at a rate for a second time interval.

33 Claims, 10 Drawing Sheets

SYSTEMS, APPARATUS, AND METHODS FOR MITIGATING TRANSMITTER INDUCED DESENSE

TECHNICAL FIELD

Embodiments of the present application relate generally to wireless communications, and more specifically to mitigating receiver interference or de-sensing in a wireless communication device that may be caused by a co-located transmitter.

BACKGROUND

Wireless communication systems are widely deployed to provide various types of communication content such as voice and data. Typical wireless communication systems may be multiple-access systems capable of supporting communication with multiple users by sharing available system resources (e.g., bandwidth, transmit power, etc). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP2, 3GPP long-term evolution (LTE), LTE Advanced (LTE-A), etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations.

Mobile devices may further simultaneously transmit and receive at various transmit and receive power levels. The transmit power level may be adjusted to allow a remote receiving device to more readily decode transmitted data and the level may be adjusted to avoid interfering with transmissions from neighboring devices. The receive power level may be dependent on various channel conditions and in some cases by emissions from the transmitter.

BRIEF SUMMARY OF SOME EMBODIMENTS

Various embodiments of systems, methods, and devices within the scope of the appended claims each have several aspects. In some embodiments all or some of these aspects can enable and provide the advantages and features of embodiments. Without limiting the scope of the appended claims, some prominent features are described herein.

Details of one or more embodiments of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the subject matter described in the disclosure provides a method of controlling a transmit power level of a wireless communications apparatus. The method includes adjusting the transmit power level of a transmitter of the wireless communications apparatus to a first transmit power level in response to detecting a de-sense event indicative of interference with a signal received by a receiver of the wireless communications apparatus due to emissions from the transmitter. The method further includes maintaining the transmit power level substantially at the first transmit power level for a first time interval in response to adjusting the transmit power level to the first transmit power level. The method further includes adjusting a transmit power level limit of the transmitter after the first time interval at a rate for a second time interval.

Another aspect of the subject matter described in the disclosure provides a wireless communications apparatus. The wireless communications apparatus includes a transmitter configured to transmit wireless communications at a transmit power level. The wireless communications apparatus further includes a receiver configured to receive wireless communications. The wireless communications apparatus further includes a controller configured to adjust the transmit power level to a first transmit power level in response to detecting a de-sense event indicative of interference with a signal received by the receiver due to emissions from the transmitter. The controller is further configured to maintain the transmit power level substantially at the first transmit power level for a first time interval in response to adjusting the transmit power level to the first transmit power level. The controller is further configured to adjust a transmit power level limit of the transmitter after the first time interval at a rate for a second time interval.

Yet another aspect of the subject matter described in the disclosure provides a wireless communications apparatus. The wireless communications apparatus includes means for transmitting wireless communications at a transmit power level. The wireless communications apparatus further includes means for receiving wireless communications. The wireless communications apparatus further includes means for adjusting the transmit power level to a first transmit power level in response to detecting a de-sense event indicative of interference with a signal received by the receiving means due to emissions from the transmitting means. The wireless communications apparatus further includes means for maintaining the transmit power level substantially at the first transmit power level for a first time interval in response to adjusting the transmit power level to the first transmit power level. The wireless communications apparatus further includes means for adjusting a transmit power level limit of the transmitter after the first time interval at a rate for a second time interval.

Another aspect of the subject matter described in the disclosure provides a computer program product comprising a non-transitory computer readable medium encoded thereon with instructions that when executed cause a wireless communications apparatus to perform a method of wireless communication. The method includes adjusting the transmit power level of a transmitter of the wireless communications apparatus to a first transmit power level in response to detecting a de-sense event indicative of interference with a signal received by a receiver of the wireless communications apparatus due to emissions from the transmitter. The method further includes maintaining the transmit power level substantially at the first transmit power level for a first time interval in response to adjusting the transmit power level to the first transmit power level. The method further includes adjusting a transmit power level limit of the transmitter after the first time interval at a rate for a second time interval.

Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

Figure 1:
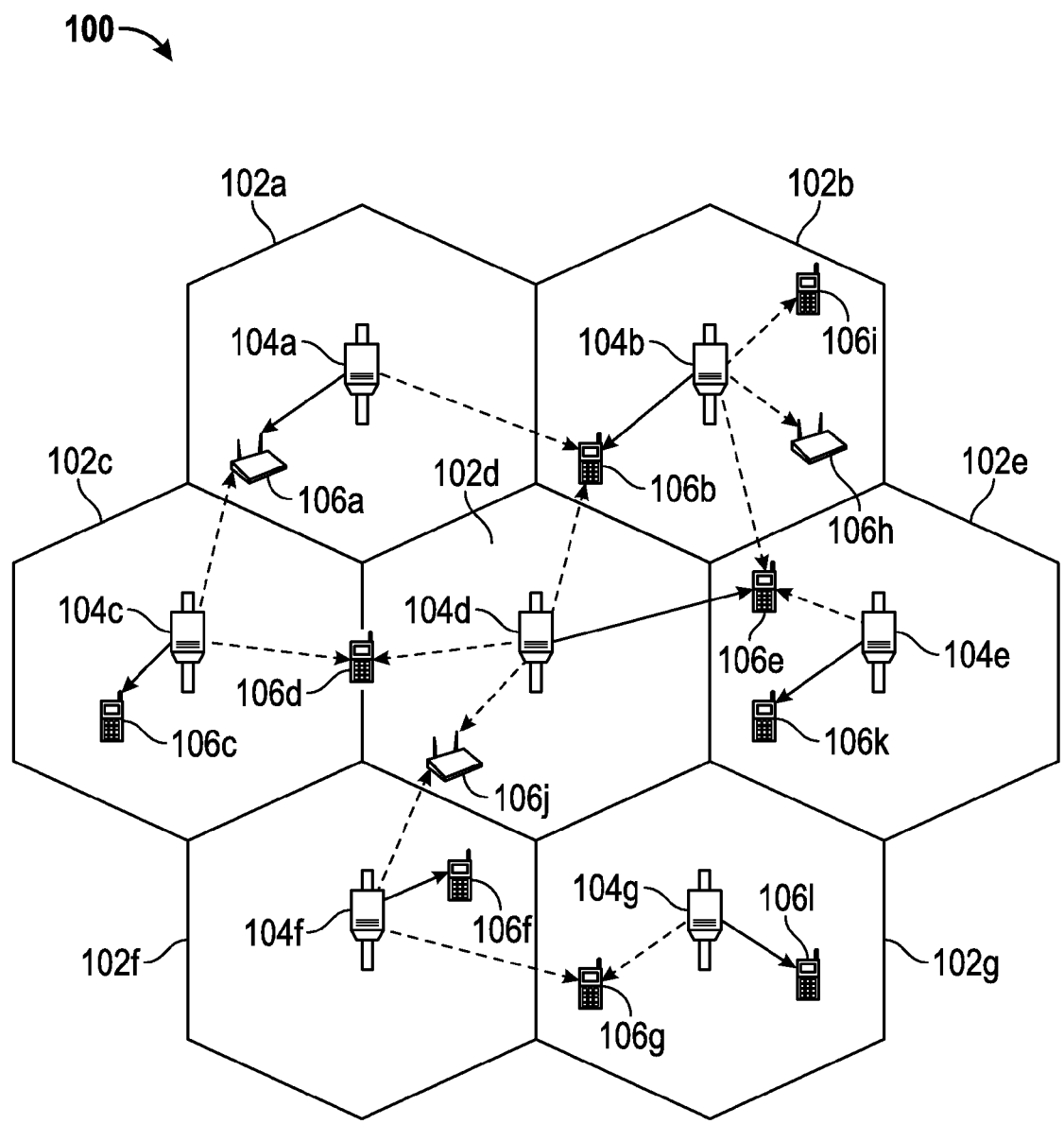
FIG. 1 is a simplified diagram of an exemplary wireless communication system in accordance with some embodiments.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method, or device. Like reference numerals may be used to denote like features throughout the specification and figures.

DETAILED DESCRIPTION

Various aspects of embodiments within the scope of the appended claims are described below. It should be apparent that the aspects described herein may be implemented in a wide variety of forms and that any specific structure and/or function described herein is merely illustrative. Based on the present disclosure a person/one having ordinary skill in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

The word "exemplary" is used herein to mean "serving as an example, instance, or illustration." Any embodiment described herein as "exemplary" is not necessarily to be construed as preferred or advantageous over other embodiments. The following description is presented to enable any person skilled in the art to make and use the invention. Details are set forth in the following description for purpose of explanation. It should be appreciated that one of ordinary skill in the art would realize that the invention may be practiced without the use of these specific details. In other instances, well known structures and processes are not elaborated in order not to obscure the description of the invention with unnecessary details. Thus, the present invention is not intended to be limited by the embodiments shown, but is to be accorded with the widest scope consistent with the principles and features disclosed herein.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (WCDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM", etc. UTRA, E-UTRA, and GSM are part of Universal Mobile Telecommunication System (UMTS). Long Term Evolution (LTE) is a release of UMTS that uses E-UTRA. UTRA, E-UTRA, GSM, UMTS and LTE are described in documents from an organization named "3rd Generation Partnership Project" (3GPP). cdma2000 and EV-DO are described in documents from an organization named "3rd Generation Partnership Project 2" (3GPP2).

The techniques described herein may further be used with various modes associated with different radio access technologies such as simultaneous voice and data modes that allow simultaneously sending and receiving voice and non-voice data. For example, Simultaneous 1X Voice and EV-DO Data (SVDO) and Simultaneous 1X and LTE (SVLTE) modes may be employed in various embodiments.

Single carrier frequency division multiple access (SC-FDMA), which utilizes single carrier modulation and frequency domain equalization is one technique used in a wireless communication system. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP Long Term Evolution (LTE), or Evolved UTRA.

FIG. 1 illustrates an exemplary wireless communication network 100 in accordance with some embodiments. The wireless communication network 100 is configured to support communication between a number of users. The wireless communication network 100 may be divided into one or more cells 102, such as, for example, cells 102a-102g. Communication coverage in cells 102a-102g may be provided by one or more nodes 104 (e.g., base stations), such as, for example, nodes 104a-104g. Each node 104 may provide communication coverage to a corresponding cell 102. The nodes 104 may interact with a plurality of access terminals (ATs), such as, for example, ATs 106a-106l. For ease of reference, ATs 106a-106l may be referred to hereinafter as an access terminal 106.

Each AT 106 may communicate with one or more nodes 104 on a forward link (FL) and/or a reverse link (RL) at a given moment. A FL is a communication link from a node to an AT. A RL is a communication link from an AT to a node. The FL may also be referred to as the downlink. Further, the RL may also be referred to as the uplink. The nodes 104 may be interconnected, for example, by appropriate wired or wireless interfaces and may be able to communicate with each other. Accordingly, each AT 106 may communicate with another AT 106 through one or more nodes 104.

The wireless communication network 100 may provide service over a large geographic region. For example, the cells 102a-102g may cover only a few blocks within a neighborhood or several square miles in a rural environment. In one embodiment, each cell may be further divided into one or more sectors (not shown).

As described above, a node 104 may provide an access terminal (AT) 106 access within its coverage area to another communications network, such as, for example the internet or another cellular network.

An AT 106 may be a wireless communication device (e.g., a mobile phone, router, personal computer, server, etc.) used by a user to send and receive voice or data over a communications network. An access terminal (AT) 106 may also be referred to herein as a user equipment (UE), as a mobile station (MS), or as a terminal device. As shown, ATs 106a, 106h, and 106j comprise routers. ATs 106b-106g, 106i, 106k, and 106l comprise mobile phones. However, each of ATs 106a-106l may comprise any suitable communication device.

An access terminal 106 may be multimode, capable of operating using different radio access technologies (RATs) such as radio access technologies defined by standards such as cdma2000 1x, 1x-EV-DO, LTE, eHRPD, 802.11, and the like. An access terminal 106 may perform a plurality of tasks across various communication systems using different radio access technologies. The communication may be accomplished using a plurality of collocated transmitters or may be communicated using one single transmitter.

Although the following embodiments may refer to FIG. 1, one will recognize that they are readily applicable to other communication standards. For example, one embodiment may be applicable in a UMTS communication system. Some embodiments may be applicable in an OFDMA communication system. The communication system 200 may further comprise any type of communication system including, but not limited to, a code division multiple access (CDMA) system, a global system for mobile communication system (GSM), a wideband code division multiple access (WCDMA), and an OFDM system.

Figure 2:
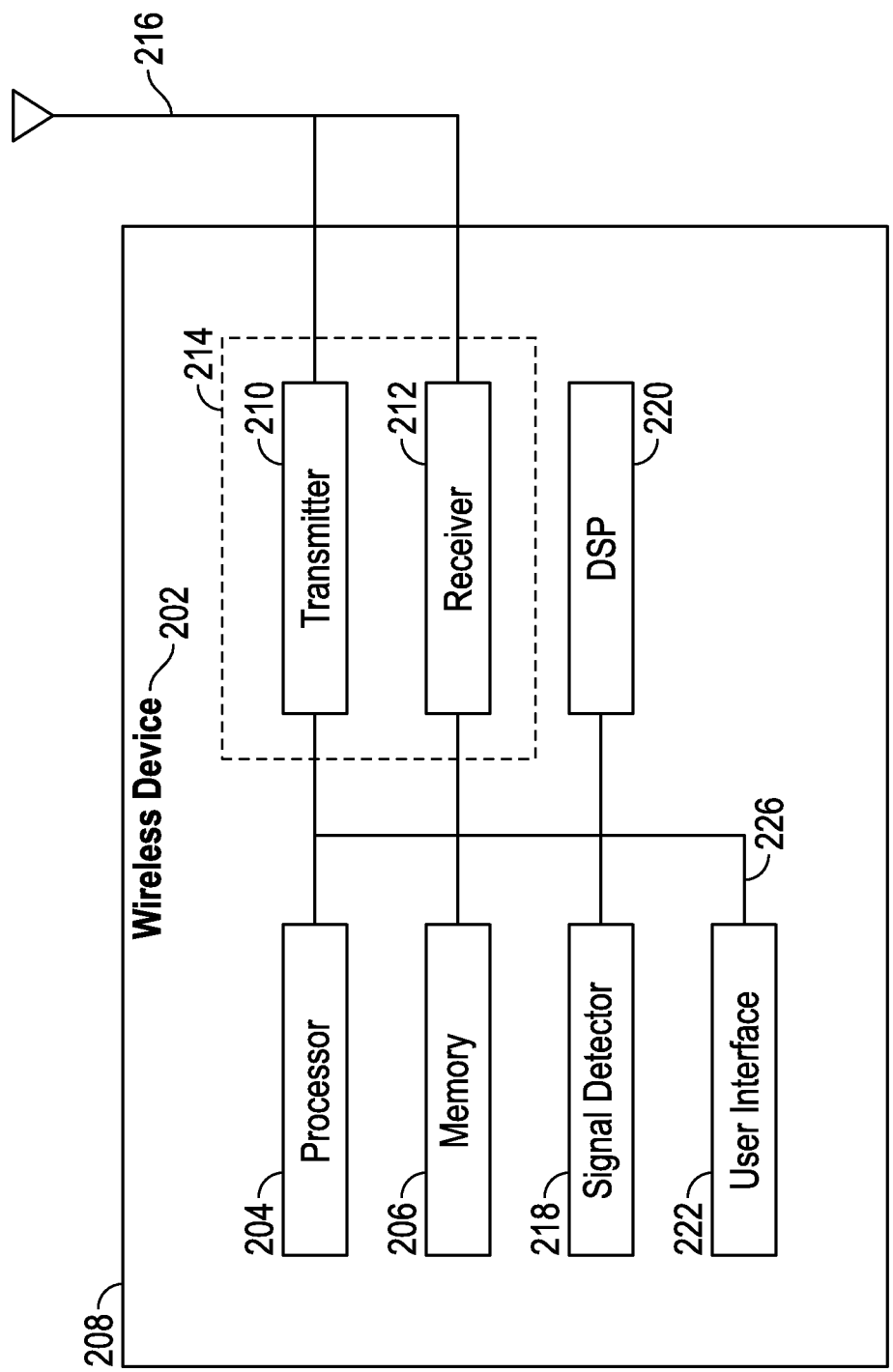
FIG. 2 is a functional block diagram of a wireless device that may be employed within the wireless communication system of FIG. 1 according to some embodiments.

FIG. 2 shows an exemplary functional block diagram of a wireless communications apparatus 202 that may be employed within the wireless communication system 100 of FIG. 1. The wireless communications apparatus 202 is an example of a device that may be configured to implement the various methods described herein. For example, the wireless communications apparatus 202 may comprise the node 104 or an AT 106.

The wireless communications apparatus 202 may include a processor 204 which controls operation of the wireless communications apparatus 202. The processor 204 may also be referred to as a central processing unit (CPU), a controller, or a control unit. Memory 206, which may include both read-only memory (ROM) and random access memory (RAM), may provide instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The processor 204 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless communications apparatus 202 may also include a housing 208 that may include a transmitter 210 and/or a receiver 212 to allow transmission and reception of data between the wireless communications apparatus 202 and a remote location. The transmitter 210 and receiver 212 may be combined into a transceiver 214. An antenna 216 may be attached to the housing 208 and electrically coupled to the transceiver 214. The wireless communications apparatus 202 may also include (not shown) multiple transmitters, multiple receivers, multiple transceivers, and/or multiple antennas.

The wireless communications apparatus 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless communications apparatus 202 may also include a digital signal processor (DSP) 220 for use in processing signals. The DSP 220 may be configured to generate one or more frames for transmission.

The wireless communications apparatus 202 may further comprise a user interface 222 in some aspects. The user interface 222 may comprise a keypad, a microphone, a speaker, and/or a display. The user interface 222 may include any element or component that conveys information to a user of the wireless communications apparatus 202 and/or receives input from the user.

The various components of the wireless communications apparatus 202 may be coupled together by a bus system 226. The bus system 226 may include a data bus, for example, as well as a power bus, a control signal bus, and a status signal bus in addition to the data bus. Those of skill in the art will appreciate the components of the wireless communications apparatus 202 may be coupled together or accept or provide inputs to each other using some other mechanism.

Although a number of separate components are illustrated in FIG. 2, those of skill in the art will recognize that one or more of the components may be combined or commonly implemented. For example, the processor 204 may be used to implement not only the functionality described above with respect to the processor 204, but also to implement the functionality described above with respect to the signal detector 218 and/or the DSP 220. Further, each of the components illustrated in FIG. 2 may be implemented using a plurality of separate elements.

A transmit power level of the transmitter 210 may be adjusted by the wireless communications apparatus 202 to improve performance within the wireless communications system 100. For example, the processor 204 may increase the transmit power level of the transmitter 210 so that a node 104, for example, may more readily decode data transmitted via the transmitter 210. In addition, the processor 204 may reduce the transmit power level to avoid transmitting at high power levels that may interfere with transmissions from other ATs 106 in the wireless communications system 100. The processor 204 may adjust the transmit power level using one or more power control loop procedures.

For example, the processor 204 may use a closed loop power control procedure where the base station 104 transmits power control messages to the wireless communications apparatus 202 and the processor 204 adjusts the transmit power level based on received power control messages. This allows the base station 104, who has knowledge of other neighboring ATs 106 as well as the ability to determine how well messages are being received from the wireless communications apparatus 202 to adjust the transmit power level accordingly. For example, the base station 104 may transmit power control messages to request the processor 204 to increase the transmit power level if distance between the wireless communications apparatus 202 and the base station 104 is increasing. In addition, the base station 104 may be able to detect interference between several different ATs 106 and transmit power control messages to request the processor 204 to reduce the transmit power level to reduce the interference between the neighboring ATs 106.

In addition to, or alternatively, the processor 204 may use an open loop power control procedure where the processor 204 selects a transmit power level based on channel measurements performed by the processor 204 without relying on information received from another node 104. In addition, other transmit power control procedures may be employed.

In addition to controlling the transmit power level to improve performance of the wireless communications apparatus 202 in the wireless communications system 100, the wireless communications apparatus 202 may further adjust operation to improve the ability of the receiver 212 to receive wireless communications. For example, if there are poor channel conditions, the receiver 212 detects an increase in the number of incorrectly received frames. In response to the number of incorrectly received frames being equal to or above a threshold, the processor 204 may deactivate the transmitter 210 during a time period to improve the ability to receive subsequent frames. In one aspect, the processor 204 may deactivate the transmitter 210 in response to a transmit power command received from the base station 104 after messages are transmitted to the base station 104 indicating that a certain number of consecutive bad frames were received by the receiver 212. Once the receiver 212 begins to successfully decode a sufficient number of subsequent frames, the processor 204 re-activates the transmitter 210 and transmit power control resumes as described above.

The transmitter 210 and the receiver 212 may transmit and receive wireless communications simultaneously. In some cases, simultaneous operation results in significant interference between the transmitter 210 and the receiver 212. For example, in some cases, as the processor 204 increases the transmit power level of the transmitter 210, emissions from the transmitter 210 may be coupled back into the receiver 212. Accordingly, the receive power level may rise (e.g., by 10-30 dB) mostly due to noise that may corrupt a received signal. This results in lost frames or frames that cannot be accurately decoded. Interference in the receiver 212 caused by the transmitter 210 may be referred herein to as the transmitter 210 de-sensing the receiver 212.

Incorrectly received frames due to a de-sense event may trigger the processor 204 to disable the transmitter 210 for a certain period of time as described above. However, once the transmitter 210 is re-activated, the "normal" power control procedures, for example as described above, that are resumed may be insufficient to prevent further de-sense events. Stated another way, the normal power control procedures may increase the transmit power level too aggressively resulting in subsequent de-sensing of the receiver 212. While the "normal" transmit power level control procedures may take into account various channel conditions known to the base station 104 and/or wireless communications apparatus 202, the procedures may not take into account de-sensing of the receiver 212 by the transmitter 210. As such, de-sensing may continuously result in triggering deactivation of the transmitter 210 several times within a short time period. This may result in dropped calls, chopped quality, and otherwise poor call performance. Certain aspects of certain embodiments described herein are directed to detecting the de-sensing of the receiver 212 by the transmitter 210 as distinct from poor channel conditions. Furthermore, certain aspects of certain embodiments are directed to controlling the transmit power level of the transmitter 210 in response to detecting a de-sense event to prevent subsequent de-sensing of the receiver 212.

Figure 3:
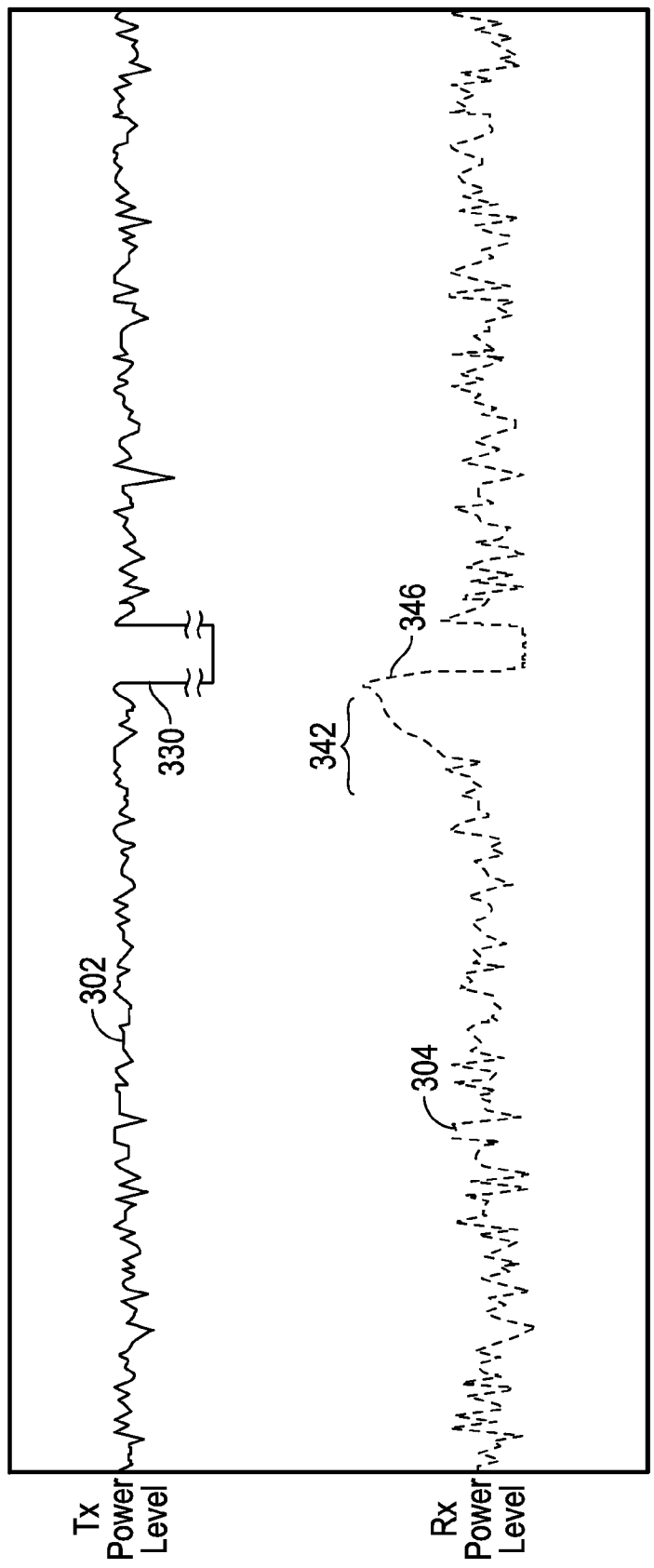
FIG. 3 is a plot illustrating exemplary transmit and receive power levels for a time period when a receiver is de-sensed due to emissions from a transmitter.

FIG. 3 is a plot illustrating exemplary transmit and receive power levels 302 and 304 for a time period when a receiver 212 is de-sensed due to emissions from a transmitter 210 within the same wireless communications apparatus 202. It should be appreciated that the transmit and receive power levels 302 and 304 are not drawn to scale and are provided for purposes of illustration only. The transmit and receive power levels 302 and 304 may be exaggerated in portions for further purposes of illustration. As shown in FIG. 3, the transmit power level 302 fluctuates as dictated by a transmit power level control procedure as described above. Furthermore, the receive power level 304 also fluctuates due to various channel conditions. At some point, the receive power level 304 may begin to rise as shown in time interval 342 that is caused by increases (not shown) in the transmit power level 302 resulting in a de-sense event 346. As a result, the receiver 212 may begin to drop frames. Once the number of consecutive dropped frames is equal to or above a threshold, at point 330, the processor 204 may disable the transmitter 210 resulting in the transmit power level 302 falling substantially to zero based on an assumption that there are bad receive channel conditions. For example, in an embodiment, the threshold triggering deactivation of the transmitter 210 may be twelve consecutively received bad frames. In other embodiments, the threshold may be a different number of consecutively received bad frames.

As a result of disabling the transmitter 210, the receive power level 304 may also drop as a result of less noise being present in a received signal. After a number of consecutively received good frames is equal to or above a threshold, the transmitter 210 may be-reactivated. For example, in an embodiment, the threshold may be two frames. In another embodiment, the threshold may be a different number of consecutive correctly received frames. After re-activation, the transmit power level 302 continues to fluctuate and the receive power level 304 may also continue to fluctuate and operate in the same manner as before the de-sense event 346. Without further power control, the transmitter 210 may subsequently de-sense the receiver 212 multiple times causing the transmitter 210 to be disabled multiple times and resulting in bad call quality and/or dropped calls.

To prevent this situation, certain aspects of certain embodiments are directed to detecting when the de-sense event occurs and subsequently adapting the transmit power level control procedures to prevent further de-sensing.

Figure 4:
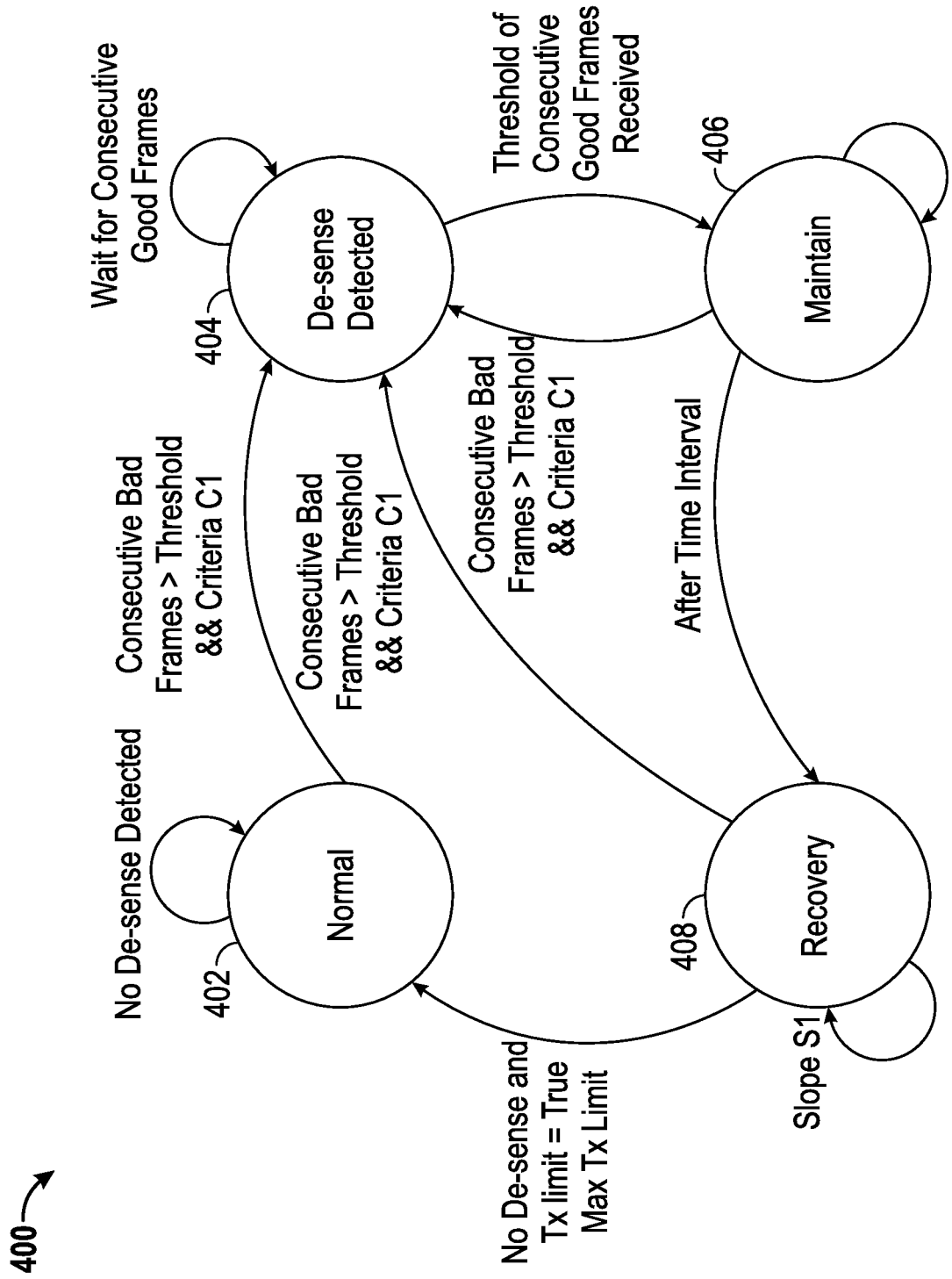
FIG. 4 is a state diagram illustrating an exemplary method for controlling a transmit power level of a transmitter in response to a de-sense event in accordance with some embodiments.

FIG. 4 is a state diagram illustrating an exemplary method for controlling a transmit power level of a transmitter 210 in response to a de-sense event in accordance with some embodiments. In state 402, the wireless communications apparatus 202 operates according to a "normal" power control procedure. In this state 402, the processor 204 may adjust the transmit power level according to channel conditions and/or received power control commands as described above. The wireless communications apparatus 202 may operate in this state while no de-sense event is detected. In some cases, while in this state 402, the receiver 212 may detect that a number of consecutive incorrectly received frames is equal to or above a first threshold (e.g., twelve as described above). In response, the processor 204 may disable the transmitter 210. However, if further criteria are not satisfied that indicate de-sensing of the receiver 212, then the wireless communications apparatus 202 may remain in state 402 and re-enable the transmitter 210 after a number of consecutive correctly received frames is equal to or above a second threshold (e.g., two as described above) and normal transmit power control procedures may resume.

The wireless communications apparatus 202 changes state to a de-sense detected state 404 when the wireless communications apparatus 202 detects that both a number of consecutive incorrectly received frames is equal to or above a first threshold and an additional criteria C1 is satisfied. In an embodiment, the additional criteria C1 corresponds to detecting, for example, that a change in the receive power level within a time window when the transmitter 210 is deactivated due to exceeding the first threshold is equal to or above a third threshold. For example, a de-sense event may be detected in response to both the first threshold being exceeded and the receive power level dropping by X dB in response to shutting off the transmitter 210. In an embodiment, the value of X dB may be 6 dB. In another embodiment, the value of X dB may be a different value such as 4 dB, 5 dB, 7 dB, 8 dB, or values in between, or otherwise. In an embodiment, if the first threshold is exceeded, then the de-detected state 404 is triggered when the receiver power level drops by 6 dB one frame, for example, after the transmitter 210 is shut off. Detection according to an additional criteria C1 as described above may allow to detect a de-sense event apart from changes in channel conditions so that more adaptive transmit power level control procedures may be adapted to prevent further de-sensing.

In the de-sense detected state 404, the processor 204 may deactivate the transmitter 210 and the wireless communications apparatus 202 may operate in this state 404 until the processor 204 is allowed to reactivate the transmitter 210 after a number of consecutive correctly received frames is equal to or above the second threshold as described above. In this state 404, the processor 204 sets the transmit power level to a nominal transmit power level. In an embodiment, the nominal transmit power level corresponds to some power level prior to the de-sensing of the receiver 212 that is stored by the wireless communications apparatus 202. In an embodiment, the nominal transmit power level may be the power level a certain number of frames before the de-sense event occurred. For example, the number of frames may be 20 frames before the de-sense event occurred. In other embodiments, the number of frames may be different such as 10 or 30 frames or in between. The nominal power level is used when the transmitter 210 is re-enabled.

Furthermore, as will be described in more detail below, after the transmitter 210 is re-enabled, an additional upper transmit power limit may be used that may allow for constraining future increases in the transmit power level. In the de-sense detected state 404, the upper transmit power limit may be initially set to ensure the transmit power level does is not immediately set too high. For example, in an embodiment, the upper transmit power limit may be set to a maximum of either the absolute maximum power level limit available or the nominal transmit power level added to some added amount. For example, the added amount may be 3 dB in an embodiment. In another embodiment, the added amount may be 4 dB, 5 dB, 6 dB, or the like. In an embodiment, the absolute maximum power level limit available may be 16 dBm. As described above, before the nominal transmit power level and the upper transmit power level are used, the wireless communications apparatus 202 remains in the de-sense detected state 404 until a number of consecutive correctly received frames is equal to or above the second threshold.

Once the number of consecutive received good frames is equal to or above the second threshold, operation transitions to a "maintain" state 406. In the state 406, the processor 204 re-enables the transmitter 210 and sets the transmit power level to the nominal power level as described above. In this state 406, the processor 204 then maintains the transmit power level at the nominal power level for a time interval. For example, in an embodiment, the time interval may be one second. In another embodiment, the time interval may be for a shorter or for a longer amount of time. While in the maintain state 406, the wireless communications apparatus 202 may detect another de-sense event, i.e., that the number of consecutive incorrectly received frames is equal to or above the first threshold and that the change in receive power level due to the transmitter 210 being disabled is above a threshold. As a result, the state 406 may transition back to the de-sense detected state 404 in which the transmit power level is re-adjusted downward for when the transmitter 210 is later enabled.

Once the time interval has elapsed and a subsequent de-sense event has not been detected, the state transitions to a recovery state 408. In the recovery state 408, transmit power control procedures may resume to potentially increase the transmit power level. However, the processor 204 adjusts the upper transmit power limit so that the transmit power level is gradually increased at a controlled rate. For example, the upper transmit power limit may be used and adjusted such that the transmit power level is allowed to gradually increase so long as the transmit power level is below the upper transmit power limit. This upper transmit power limit may be increased at a relatively gradual rate until it is increased to the maximum allowed power transmit limit. In contrast, in the "normal" state 402, rather than using an additional upper transmit power limit, the maximum allowed power transmit limit is used as the ceiling. As such, it is possible in the normal state 402 that the transmit power level control procedures may increase the transmit power level too fast and cause subsequent de-sensing of the receiver 212. However, in the recovery state 408, the slope of any increases in transmit power level is managed by adjusting the upper transmit power limit at a certain rate. The initial value for the upper power limit may be set in the de-sense detected state 404 as described above.

As an example, in an embodiment, the processor 204 increases the upper transmit power limit by an amount every M frames. In an embodiment, the value of M may be 20 frames. In another embodiment, the value of M may be 10 frames, 15 frames, 25 frames, 30 frames, or the like, or another value. In an embodiment, the amount by which to increase the upper power transmit limit may be a function of the current upper transmit power limit and another value. For example, the amount to increase the upper power transmit limit may be determined according to the following equation:

$$UpperPowerT \times \text{Limit} = \frac{ML - UpperPowerT \times \text{Limit}}{Z}$$

In an embodiment, the value of ML may be 24 or some other value depending on various operating conditions. In an embodiment, the value of Z may be some integer such as 20, or some other value (e.g., 10, 15, 25, 30, etc.). As the upper power transmit limit is increased, the processor 204 may also increase the transmit power level correspondingly as bounded by the upper power transmit limit as further described by a slope S1. "Normal" closed loop and open loop may be used for adjusting the transmit power level based on the received power commands and/or channel measurements, while using the upper transmit power limit as an upper ceiling on the transmit power level. While in the recovery state 408, the wireless communications apparatus 202 may additionally detect another de-sense event, i.e., that the number of consecutive incorrectly received frames is equal to or above the first threshold and that the change in receive power level due to the transmitter 210 being disabled is above a threshold. In this case, the state may transition back to the de-sense detected state 404 by which the transmit power level is re-adjusted lower for when the transmitter 210 is later enabled.

The values for determining the amount to increase the upper transmit power limit may be dynamic and be determined by the transmit power level at the point when de-sense event is detected. For example, the higher the transmit power level is when the de-sense detected, the slower the upper transmit power limit is adjusted. Stated another way, the higher the transmit power level is when the de-sense is detected, the lower the slope S1 is for increasing the upper transmit power limit. Any of the values, M, ML, or Z may be adjusted to adaptively adjust the rate by which to constrain increases in the transmit power level. Furthermore, the number of times in which the de-sense event is detected within a time interval may further determine the amount by which to constrain increases in the transmit power level.

Once the upper transmit power level limit reaches the maximum allowed transmit power limit (e.g., 16 dB) and no de-sense even has been detected, state transitions to the normal state 402.

Accordingly, in response to a de-sense event, the transmit power level is first lowered and maintained for a time period and then increased at a controlled rate. This may allow for preventing further de-sense events and preventing multiple transmitter shut-downs that may result in dropped calls or choppy call quality. In one aspect, the approach described above to adjust the transmit power level to a lower value directly in response to detecting the de-sense may result in a somewhat increased risk of dropped calls immediately after the transmitter 210 is re-activated due to a lower transmit power level. However, by lowering the transmit power level and then subsequently controlling the increase rate, the risk of further de-sense events that may result in multiple transmitter deactivation events may provide an increased overall improvement in call quality and less dropped calls.

Figure 5:
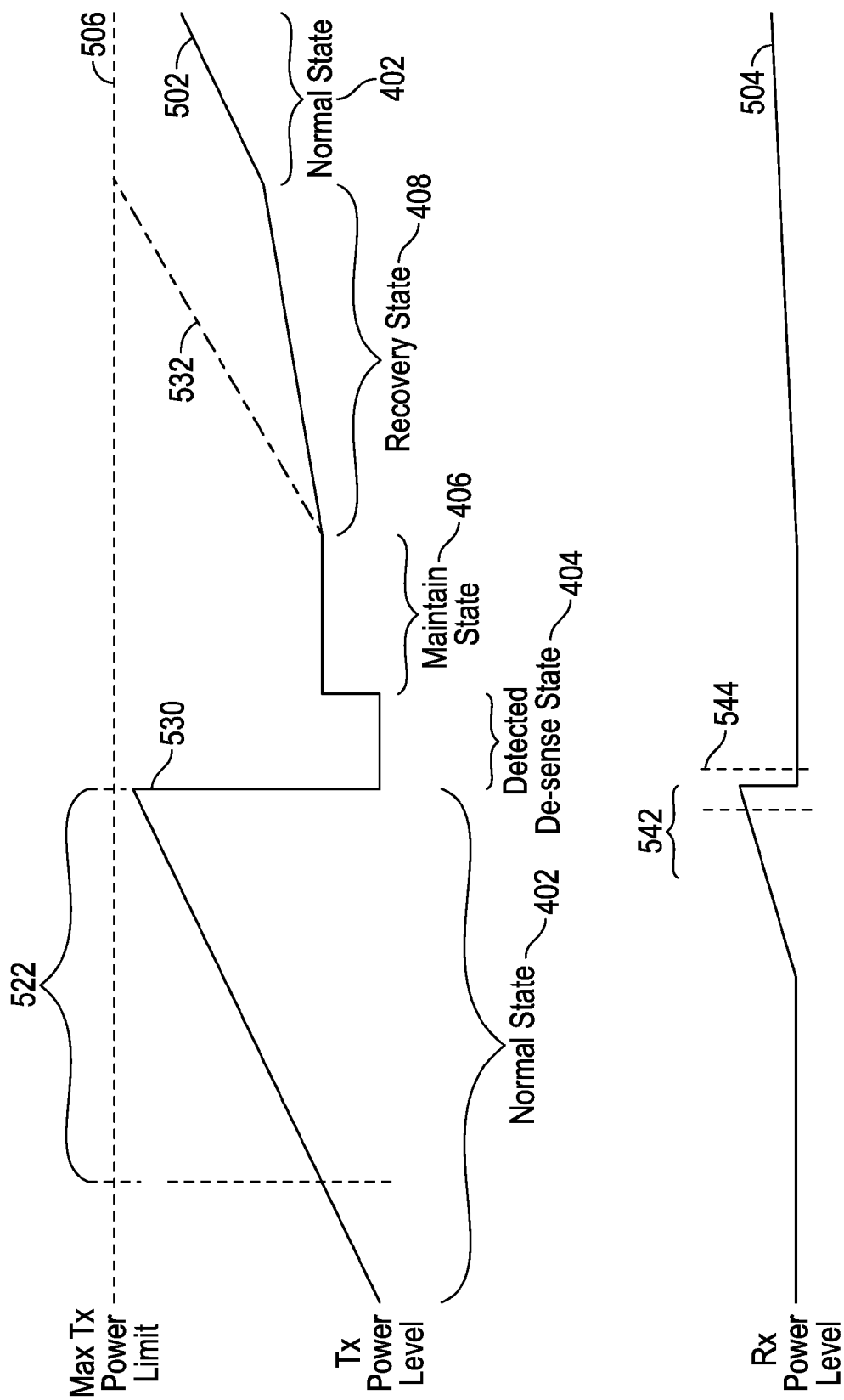
FIG. 5 is a plot illustrating exemplary adjusted transmit power levels and receive power levels in accordance with the state diagram of FIG. 4.

FIG. 5 is a plot illustrating exemplary averaged transmit power levels 502 and averaged receive power levels 504 in accordance with the state diagram of FIG. 4. The transmit power levels 502 and receive power levels 504 show general trends in the transmit power levels 502 and receive power levels 504 that do not show the smaller fluctuations as shown in FIG. 3 for purposes of illustration. Furthermore, the transmit power levels 502 and receive power levels 405 are not drawn to scale. In actuality, there may be further fluctuations in the transmit power levels 502 and receive power levels 504 as described above.

As shown in FIG. 5, during the normal state 402, the processor 204 increases the transmit power level 502 while staying under the maximum transmit power level limit 506. The increase may be due to any one of a number of reasons to improve system performance as described above. As the transmit power level increases, at some point the receive power level 504 increases due to interference from the transmitter 210. As shown by interval 542, the results in number of consecutive incorrectly received frames being above a threshold in addition to a drop in the receiver power level 504 in some time window 544 when the transmitter 210 is shut down being below a threshold. As such, corresponding to the de-sense detected state 404, the processor 204 disables the transmitter 210 and the transmit power level falls to substantially zero. After detecting a number of consecutive correctly received frames, the processor 204 activates the transmitter 210 and the transmit power level is set to a nominal power level. This nominal power level may correspond to 20 frames before the de-sense event 530 as indicated by reference numeral 522 as described above.

The transmit power level is then maintained at this nominal power level. This may correspond to the maintain state 406 of FIG. 4. Subsequently, the processor 204 is allowed to increase the transmit power level using the power control procedures. In addition, an upper transmit power limit 532 constraining the transmit power level is increased at controlled rate. This may correspond to the recovery state 408. As shown, the transmit power level is increased along with the upper transmit power limit. In some cases the transmit power level may track the upper transmit power limit closely, particularly where the upper transmit power limit is increased relatively more slowly than in other situations. Once the upper transmit power limit reaches the maximum allowed power transmit limit, then the transmit power level is adjusted and possibly increased and bound by the maximum allowed power transmit limit corresponding to a state transition back to the normal state 402.

Figure 6:
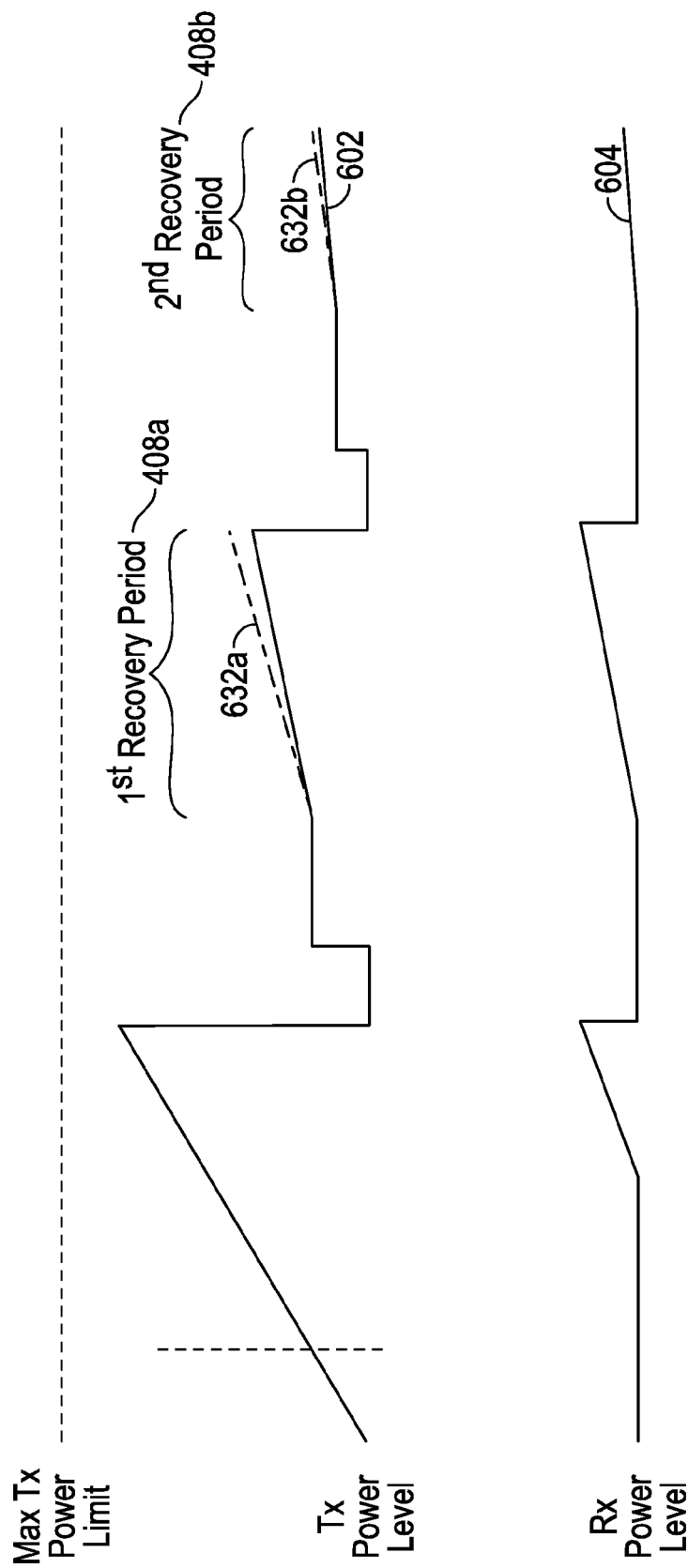
FIG. 6 is plot illustrating other exemplary adjusted transmit power levels and receive power levels in accordance with the state diagram of FIG. 4.

FIG. 6 is plot illustrating other exemplary adjusted transmit power levels and receive power levels in accordance with the state diagram of FIG. 4 when multiple de-sense events are detected. FIG. 6 similarly shows averaged transmit and receive power levels, but where a second de-sense event is detected. As shown, the slope of the increase of the upper transmit power limit 632a during a first recovery period is steeper than the slope of the upper transmit power limit 632b during a second recovery period to further constrain the transmit power limit to prevent future de-sense events. As such, FIG. 6 illustrates how the processor 204 may adapt the transmit power level control procedures to prevent further de-sensing in response to multiple de-sense events within a time period.

Figure 7:
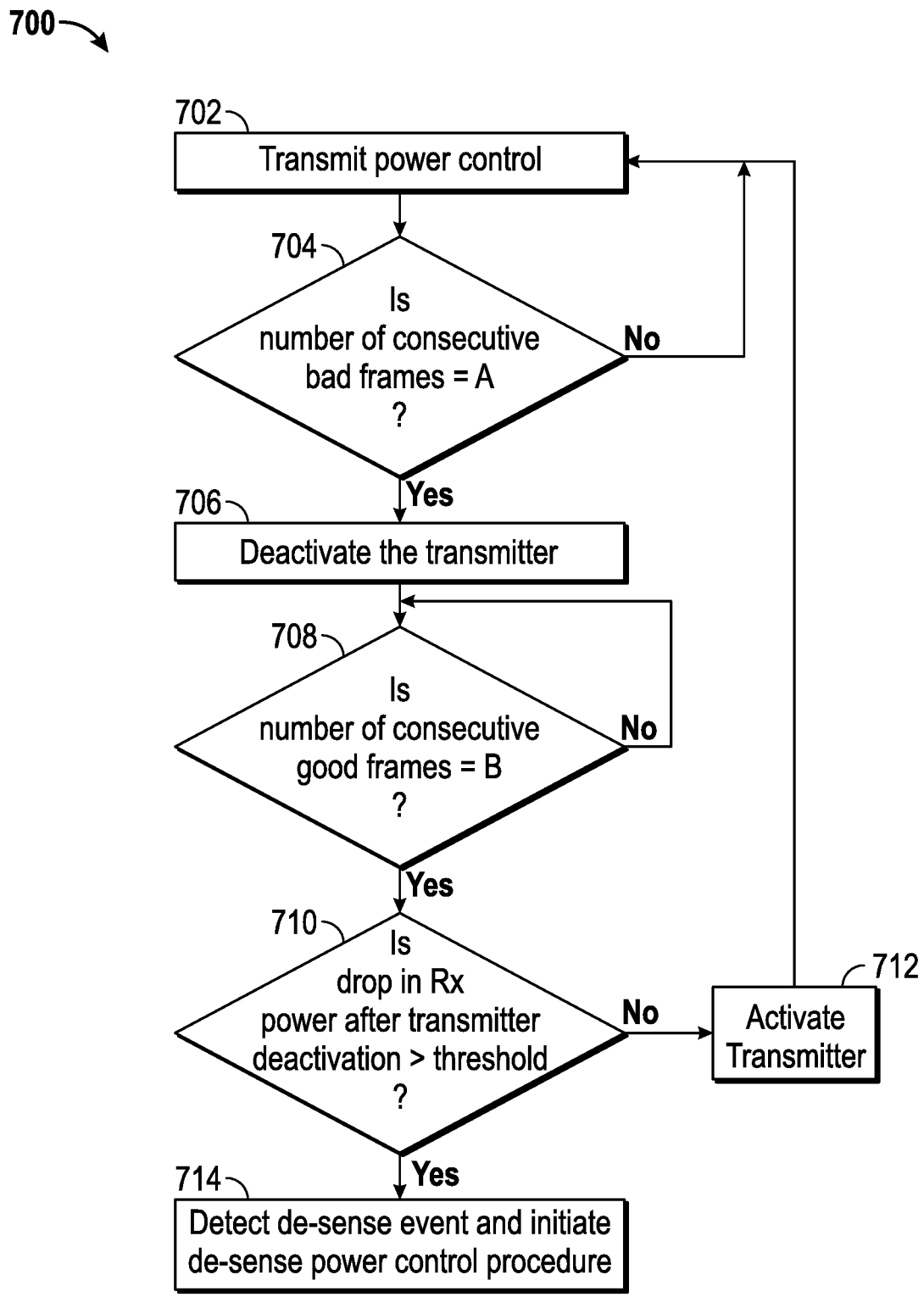
FIG. 7 is a flowchart of an implementation of an exemplary method for controlling transmit power levels and detecting de-sensing of a receiver by a transmitter in accordance with some embodiments.

FIG. 7 is a flowchart of an implementation of an exemplary method 700 for controlling transmit power levels and detecting de-sensing of a receiver 212 by a transmitter 210 in accordance with some embodiments. In certain aspects, the actions described in the blocks in FIG. 7 may correspond to states 402 and 404 of FIG. 4 to detect a de-sense event. Although the method 700 is described below with respect to elements of the wireless communications apparatus 202, those having ordinary skill in the art will appreciate that other components may be used to implement one or more of the blocks described herein.

At block 702, the wireless communications apparatus 202 may be performing transmit power control according power control procedures as described above (e.g., closed and open loop power control procedures). At decision block 704, it is determined if a number of consecutive bad frames is equal to a value A. For example, the value A may be 12 frames in one embodiment. As long as this condition is not satisfied, the wireless communications apparatus 202 performs the transmit power control as shown in block 702. If the condition of decision block 704 is satisfied, then at block 706, the transmitter 210 is deactivated. At decision block 706, it is determined whether a number of consecutive good frames received is equal to a value B. In an embodiment, the value B may be two frames. As long as the number of consecutive good frames is below the threshold, the transmitter 210 remains deactivated.

If the condition of block 708 is satisfied, that is if at least B good consecutive good frames has been received, then at decision block 710 it is determined whether a drop in receive power level after the transmitter 210 was deactivated is greater than a threshold. If the condition in decision block 710 is not satisfied, then at block 712 the transmitter 210 is activated and the wireless communications apparatus 202 performs normal transmit power control procedures as in block 702. If, however, the drop in the receive power level is greater than the threshold, then at block 714, a de-sense event is detected and a procedure for de-sense power control is initiated. The processor 204 and/or a combination of the processor 204 and the receiver 212 and the transmitter 210 may perform the functions of any of the blocks shown in FIG. 7.

Figure 8:
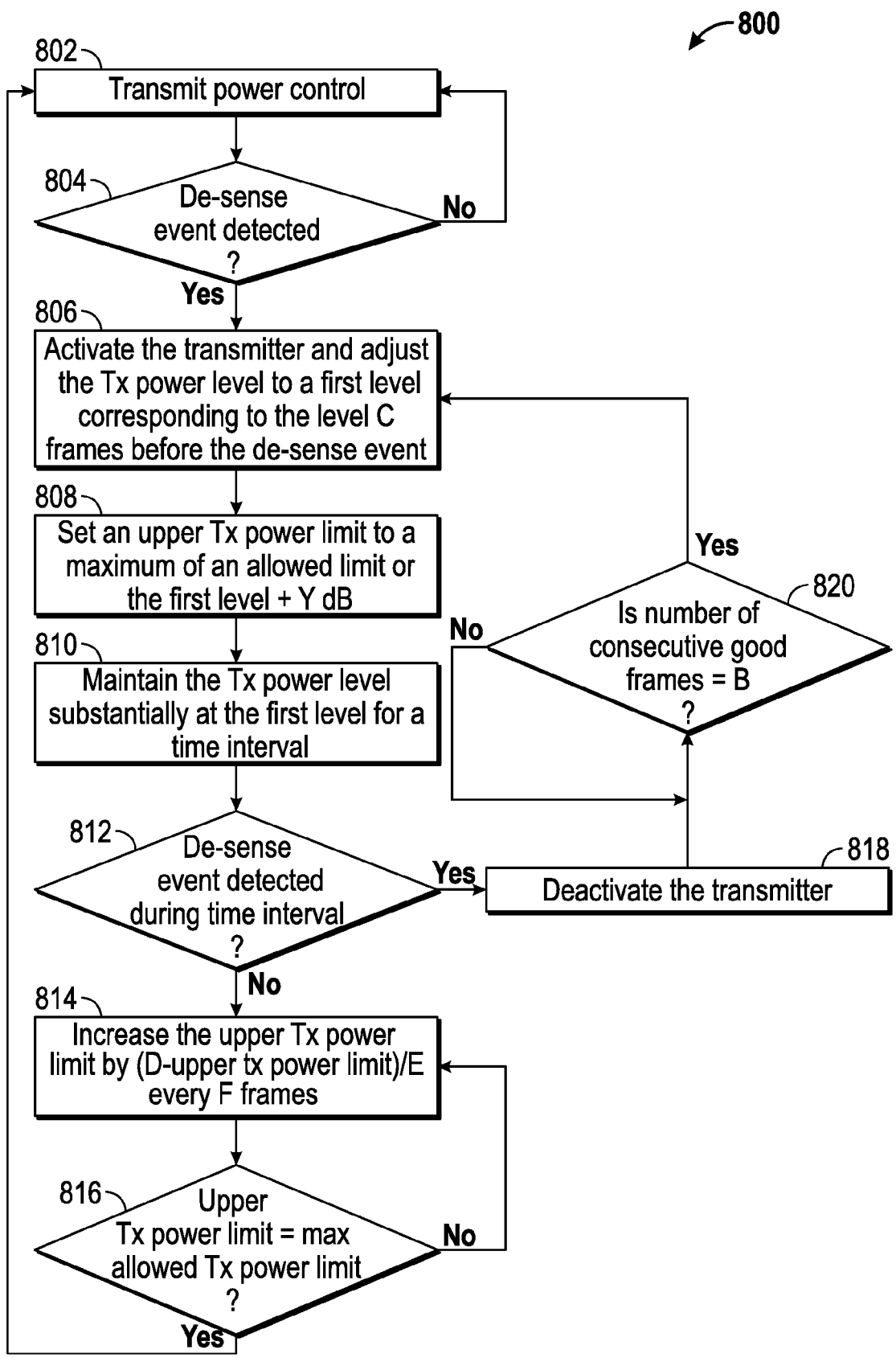
FIG. 8 is a flowchart of an implementation of an exemplary method for controlling transmit power levels in response to a de-sense event in accordance with some embodiments.

FIG. 8 is a flowchart of an implementation of an exemplary method 800 for controlling transmit power levels in response to a de-sense event in accordance with some embodiments. In certain aspects, the blocks shown in FIG. 8 may correspond to states 404, 406, and 408 of FIG. 4. Although the method 800 is described below with respect to elements of the wireless communications apparatus 202, those having ordinary skill in the art will appreciate that other components may be used to implement one or more of the blocks described herein.

At block 802, the wireless communications apparatus 202 performs transmit power control until a de-sense event is detected 804 as shown in decision bock 804 and described above with reference to FIG. 7. Once a de-sense event is detected, at block 806, the transmitter 210 is activated and the transmit power level is adjusted to a first level corresponding to the level C frames before the de-sense event. The value of C may correspond to, for example twenty frames before the de-sense event. At block 808, an upper transmit power limit is set to a maximum of either a maximum allowed transmit power limit or the first level added to Y dB. In an embodiment, the value of Y may be 6 dB. At block 810, the transmit power level is maintained substantially at the first level for a time period.

At decision block 812 it is determined if another de-sense event was detected during the time interval for maintaining the transmit power level at the first level. If in decision block 812, a de-sense was not detected during the time interval, then at block 814 the upper transmit power limit is increased by the upper transmit power limit subtracted from a value D, the difference divided by a value E. In an embodiment, the value of D may be 24 dB while the value of E may be, for example, twenty. The transmitter power limit is increased every F frames, where F may be the value 20 frames, for example. After increasing the upper transmit power limit in block 814, the processor 204 may be allowed to increase the transmit power level. In decision block 816, it may be determined if the upper transmit power limit due to the increase is substantially equal to the maximum allowed transmit power limit. If the upper transmit power limit is less than the maximum allowed transmit power limit, then the upper transmit power limit is increased every E frames according to block 814. If the upper transmit power limit is equal to or above the maximum allowed transmit power limit, then the wireless communications apparatus 202 resumes normal transmit power control as shown in block 802.

If at decision block 812 a de-sense event was detected during the time interval, then at block 818, the transmitter 210 is deactivated. The wireless communications apparatus 202 then waits until a number of consecutive correctly received frames is equal to or greater than a threshold as shown in decision block 820. Once the condition in block 818 is satisfied then block 806 proceeds and the transmit power control procedure for the de-sense continues as described above.

Figure 9:
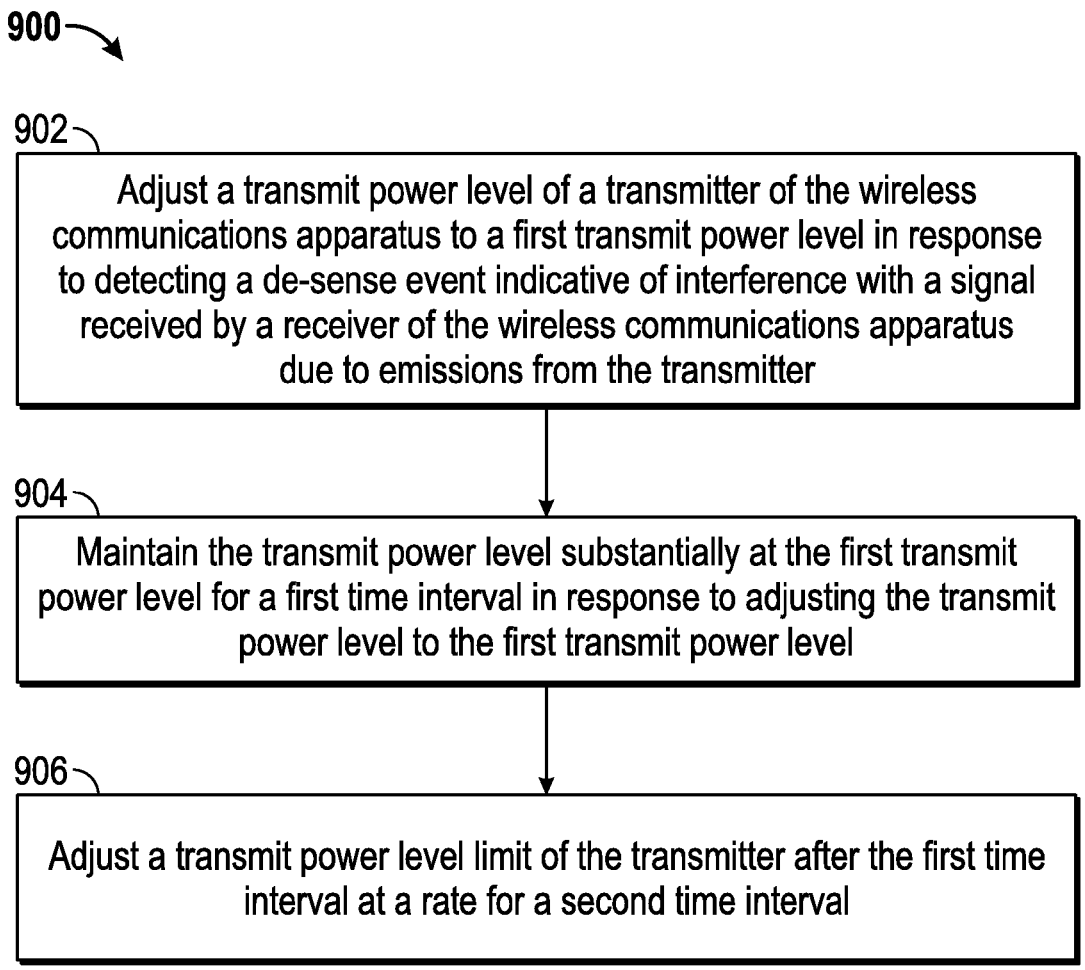
FIG. 9 is a flowchart of an implementation of an exemplary method implemented by a wireless communications apparatus in accordance with some embodiments.

FIG. 9 shows a flowchart of an implementation of an exemplary method 900 implemented by a wireless communications apparatus 202 in accordance with some embodiments. Although the method 900 is described below with respect to elements of the wireless communications apparatus 202, those having ordinary skill in the art will appreciate that other components may be used to implement one or more of the blocks described herein.

At block 902, a transmit power level of a transmitter 210 of the wireless communications apparatus 202 is adjusted to a first transmit power level in response to detecting a de-sense event indicative of interference with a signal received by a receiver 212 of the wireless communications apparatus 202 due to emissions from the transmitter 210. In one aspect, the processor 204 may adjust the transmit power level. At block 904, the transmit power level is maintained substantially at the first transmit power level for a first time interval in response to adjusting the transmit power level to the first transmit power level. In one aspect, the processor 204 may maintain the transmit power level at the first power level. At block 906, a transmit power level limit of the transmitter 210 is adjusted after the first time interval at a rate for a second time interval. For example, the transmit power level limit may be adjusted by an amount every certain number of frames until the transmit power level limit is equivalent to a maximum power transmit level limit. In one aspect, the processor 204 may adjust the transmitter power level limit of the transmitter 210 at the rate.

Figure 10:
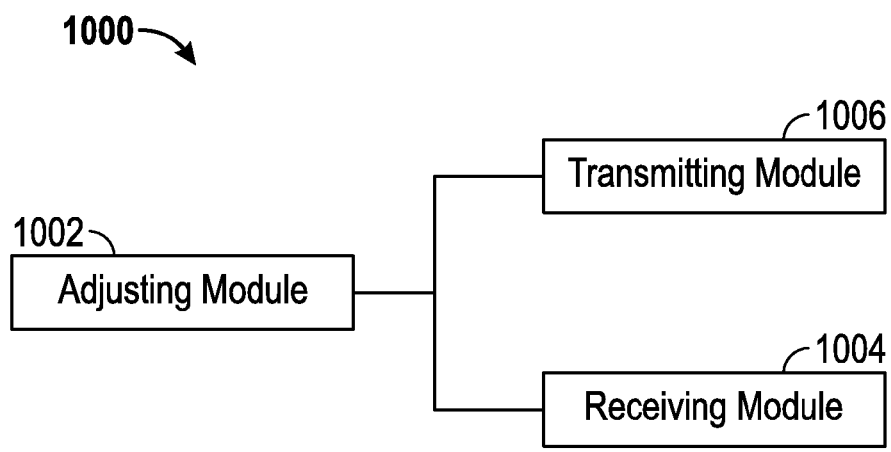
FIG. 10 is a functional block diagram of another exemplary wireless communications apparatus that may be employed within the wireless communication system in accordance with some embodiments.

FIG. 10 is a functional block diagram of another exemplary wireless communications apparatus 1000 that may be employed within the wireless communication system 100 in accordance with some embodiments. Those skilled in the art will appreciate that a wireless communication device 1000 may have more components, such as any one or more of the components shown in FIG. 2. The wireless communication device 1000 shown includes only those components useful for describing some prominent features of certain embodiments. The device 1000 includes a receiving module 1004 and a transmitting module 1006. In some cases, a means for receiving may include the receiving module 1004. In some cases, a means for transmitting may include a transmitting module 1006. The device 1000 further includes an adjusting module 1002. The adjusting module 1002 may be configured to perform one or more of the functions described above with respect to blocks 902, 904, and 906 of FIG. 9. In some cases, a means for adjusting may include the adjusting module 1002. In some cases, a means for maintaining may include the adjusting module 1002. The adjusting module 1002 may be a processor 204.

If implemented in software, the functions may be stored on or transmitted over as one or more instructions or code on a computer-readable medium. The steps of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Figure 11:
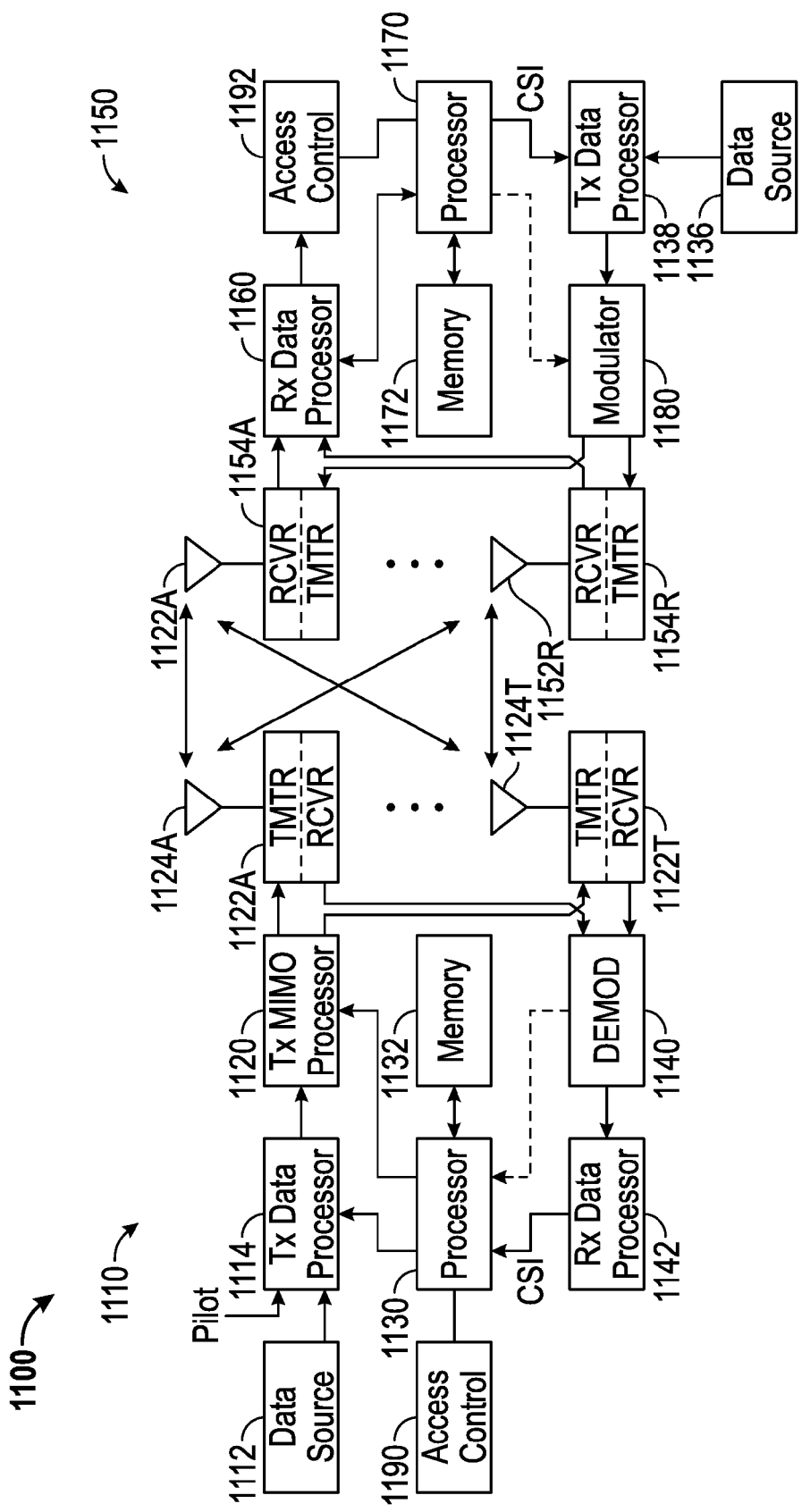
FIG. 11 shows an example of a functional block diagram of various components in a communication system in accordance with some embodiments.

Furthermore, as indicated by the systems and methods described above, the teachings herein may be incorporated into a node (e.g., a device) employing various components for communicating with at least one other node. FIG. 11 depicts several sample components that may be employed to facilitate communication between nodes in accordance with some embodiments. Specifically, FIG. 11 is a simplified block diagram of a first wireless device 1110 (e.g., an access point) and a second wireless device 1150 (e.g., an access terminal) of a multiple-in-multiple-out (MIMO) system 1100. At the first device 1110, traffic data for a number of data streams is provided from a data source 1112 to a transmit (TX) data processor 1114.

In some aspects, each data stream is transmitted over a respective transmit antenna. The TX data processor 1114 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 1130. A data memory 1132 may store program code, data, and other information used by the processor 1130 or other components of the device 1110.

The modulation symbols for all data streams are then provided to a TX MIMO processor 1120, which may further process the modulation symbols (e.g., for OFDM). The TX MIMO processor 1120 then provides $N_T$ modulation symbol streams to $N_T$ transceivers (XCVR) 1122A through 1122T. In some aspects, the TX MIMO processor 1120 applies beamforming weights to the symbols of the data streams and to the antenna from which the symbol is being transmitted.

Each transceiver 1122 receives and processes a respective symbol stream to provide one or more analog signals, and further conditions (e.g., amplifies, filters, and up converts) the analog signals to provide a modulated signal suitable for transmission over the MIMO channel. $N_T$ modulated signals from transceivers 1122A through 1122T are then transmitted from $N_T$ antennas 1124A through 1124T, respectively.

At the second device 1150, the transmitted modulated signals are received by $N_R$ antennas 1152A through 1152R and the received signal from each antenna 1152 is provided to a respective transceiver (XCVR) 1154A through 1154R. Each transceiver 1154 conditions (e.g., filters, amplifies, and down converts) a respective received signal, digitizes the conditioned signal to provide samples, and further processes the samples to provide a corresponding "received" symbol stream.

A receive (RX) data processor 1160 then receives and processes the $N_R$ received symbol streams from $N_R$ transceivers 1154 based on a particular receiver processing technique to provide $N_T$ "detected" symbol streams. The RX data processor 1160 then demodulates, deinterleaves, and decodes each detected symbol stream to recover the traffic data for the data stream. The processing by the RX data processor 1160 is complementary to that performed by the TX MIMO processor 1120 and the TX data processor 1114 at the device 1110.

A processor 1170 periodically determines which pre-coding matrix to use (discussed below). The processor 1170 formulates a reverse link message comprising a matrix index portion and a rank value portion. A data memory 1172 may store program code, data, and other information used by the processor 1170 or other components of the second device 1150.

The reverse link message may comprise various types of information regarding the communication link and/or the received data stream. The reverse link message is then processed by a TX data processor 1138, which also receives traffic data for a number of data streams from a data source 1136, modulated by a modulator 1180, conditioned by the transceivers 1154A through 1154R, and transmitted back to the device 1110.

At the device 1110, the modulated signals from the second device 1150 are received by the antennas 1124, conditioned by the transceivers 1122, demodulated by a demodulator (DEMOD) 1140, and processed by a RX data processor 1142 to extract the reverse link message transmitted by the second device 1150. The processor 1130 then determines which precoding matrix to use for determining the beam-forming weights then processes the extracted message.

FIG. 11 also illustrates that the communication components may include one or more components that perform access control operations as taught herein. For example, an access control component 1190 may cooperate with the processor 1130 and/or other components of the device 1110 to send/receive signals to/from another device (e.g., device 1150) as taught herein. Similarly, an access control component 1192 may cooperate with the processor 1170 and/or other components of the device 1150 to send/receive signals to/from another device (e.g., device 1110). It should be appreciated that for each device 1110 and 1150 the functionality of two or more of the described components may be provided by a single component. For example, a single processing component may provide the functionality of the access control component 1190 and the processor 1130 and a single processing component may provide the functionality of the access control component 1192 and the processor 1170. Furthermore, the components of the apparatus 1100 described with reference to FIG. 3 may be incorporated with/into the components of FIG. 11.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may include one or more elements.

A person/one having ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

A person/one having ordinary skill in the art would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein and in connection with FIGS. 1-11 may be implemented within or performed by an integrated circuit (IC), an access terminal, or an access point. The IC may include a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. The logical blocks, modules, and circuits may include antennas and/or transceivers to communicate with various components within the network or within the device. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The functionality of the modules may be implemented in some other manner as taught herein. The functionality described herein (e.g., with regard to one or more of the accompanying figures) may correspond in some aspects to similarly designated "means for" functionality in the appended claims.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Various modifications to the embodiments described in this disclosure may be readily apparent to those skilled in the art, and the generic principles defined herein may be applied to other embodiments without departing from the spirit or scope of this disclosure. Thus, the disclosure is not intended to be limited to the embodiments shown herein, but is to be accorded the widest scope consistent with the claims, the principles and the novel features disclosed herein. The word "exemplary" is used exclusively herein to mean "serving as an example, instance, or illustration." Any embodiment described herein as "exemplary" is not necessarily to be construed as preferred or advantageous over other embodiments.

Certain features that are described in this specification in the context of separate embodiments also can be implemented in combination in a single embodiment. Conversely, various features that are described in the context of a single embodiment also can be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products. Additionally, other embodiments are within the scope of the following claims. In some cases, the actions recited in the claims can be performed in a different order and still achieve desirable results.

What is claimed is:

1. A method of controlling a transmit power level of a wireless communications apparatus, the method comprising:
    detecting a de-sense event, wherein detecting the de-sense event comprises:
        detecting a number of consecutive incorrectly received frames being equal to or greater than a first threshold, wherein a transmitter of the wireless communications apparatus is de-activated in response to detecting that the number of consecutive incorrectly received frames is equal to or greater than the first threshold; and
        detecting that a change in a receive power level of a receiver of the wireless communications apparatus before and after the transmitter of the wireless communications apparatus is de-activated is greater than a second threshold;
    adjusting the transmit power level of the transmitter of the wireless communications apparatus to a first transmit power level in response to detecting the de-sense event;
    maintaining the transmit power level substantially at the first transmit power level for a first time interval in response to adjusting the transmit power level to the first transmit power level; and
    gradually adjusting a transmit power level limit of the transmitter after the first time interval, at a rate, for a second time interval.

2. The method of claim 1, wherein the first transmit power level corresponds to substantially the transmit power level a number of frames before the de-sense event.

3. The method of claim 2, wherein the number of frames is between ten and thirty frames.

4. The method of claim 1, wherein the first time interval is between one-half of a second and ten seconds.

5. The method of claim 1, wherein the second time interval ends when the transmit power level limit reaches a maximum power transmit limit.

6. The method of claim 1, wherein the rate corresponds to increasing the transmit power level limit by an amount every select number of frames.

7. The method of claim 6, wherein the amount is determined by dividing the transmit power limit subtracted from a first value by a second value.

8. The method of claim 7, further comprising initially determining the transmit power limit, in response to the detected de-sense event, based on a maximum of:
    a maximum transmit power limit; or
    a stored transmit power level before the de-sense event added to a third value.

9. The method of claim 8, wherein the maximum transmit power limit is 16 dBm, and wherein the third value is between 1 dB and 6 dB.

10. The method of claim 1, wherein the first threshold is between ten and fourteen frames, and wherein the second threshold is between 4 dB and 8 dB.

11. The method of claim 1, wherein adjusting the transmit power level comprises adjusting the transmit power level in response to detecting a first number of correctly received frames has been received out of a second number of consecutive frames after the de-sense event is detected.

12. A wireless communications apparatus, comprising:
    a transmitter configured to transmit wireless communications at a transmit power level;
    a receiver configured to receive wireless communications; and
    a controller configured to:
        detect a de-sense event, wherein, to detect the de-sense event, the controller is configured to:
            detect a number of consecutive incorrectly received frames being equal to or greater than a first threshold;
            de-activate the transmitter in response to detecting that the number of consecutive incorrectly received frames is equal to greater than the first threshold; and
            detect that a change in a receive power level of the receiver before and after the transmitter is de-activated is greater than a second threshold;
        adjust the transmit power level to a first transmit power level in response to detecting the de-sense event;
        maintain the transmit power level substantially at the first transmit power level for a first time interval in response to adjusting the transmit power level to the first transmit power level; and
        gradually adjust a transmit power level limit of the transmitter after the first time interval, at a rate, for a second time interval.

13. The wireless communications apparatus of claim 12, wherein the first transmit power level corresponds to substantially the transmit power level a number of frames before the de-sense event.

14. The wireless communications apparatus of claim 13, wherein the number of frames is substantially between ten frames and thirty frames, and wherein the first time interval is substantially between one-half of a second and ten seconds.

15. The wireless communications apparatus of claim 12, wherein the second time interval ends when the transmit power level limit reaches a maximum power transmit limit.

16. The wireless communications apparatus of claim 12, wherein the rate corresponds to increasing the transmit power level limit by an amount every select number of frames.

17. The wireless communications apparatus of claim 16, wherein the controller is configured to determine the amount by dividing the transmit power limit subtracted from a first value by a second value.

18. The wireless communications apparatus of claim 17, wherein the controller is configured to initially determine the transmit power limit, in response to the detected de-sense event, based on a maximum of:
    a maximum transmit power limit; or
    a stored transmit power level before the de-sense event added to a third value.

19. The wireless communications apparatus of claim 18, wherein the maximum transmit power limit is substantially 16 dBm, wherein the third value is substantially between 1 dB and 6 dB.

20. The wireless communications apparatus of claim 12, wherein the first threshold is between ten frames and fourteen frames, and wherein the second threshold is substantially between 4 dB and 8 dB.

21. The wireless communications apparatus of claim 12, wherein the controller is configured to adjust the transmit power level in response to detecting a first number of correctly received frames has been received out of a second number of consecutive frames after the de-sense event is detected.

22. A wireless communications apparatus, comprising:
means for transmitting wireless communications at a transmit power level;
means for receiving wireless communications;
means for detecting a de-sense event, wherein the means for detecting the de-sense event comprises:
means for detecting a number of consecutive incorrectly received frames being equal to or greater than a first threshold, wherein the means for transmitting is de-activated in response to detecting that the number of consecutive incorrectly received frames is greater than the first threshold; and
means for detecting that a change in a receive power level of the means for receiving before and after the means for transmitting is de-activated is greater than a second threshold;
means for adjusting the transmit power level to a first transmit power level in response to detecting the de-sense event;
means for maintaining the transmit power level substantially at the first transmit power level for a first time interval in response to adjusting the transmit power level to the first transmit power level; and
means for gradually adjusting a transmit power level limit of the means for transmitting after the first time interval, at a rate, for a second time interval.

23. The wireless communications apparatus of claim 22, wherein the first transmit power level substantially corresponds to the transmit power level a number of frames before the de-sense event.

24. The wireless communications apparatus of claim 22, wherein the rate corresponds to increasing the transmit power level limit by an amount every select number of frames, wherein the amount is determined by dividing the transmit power limit subtracted from a first value by a second value.

25. The wireless communications apparatus of claim 24, further comprising means for initially determining the transmit power limit, in response to the detected de-sense event, based on a maximum of:
a maximum transmit power limit; or
a stored transmit power level before the de-sense event added to a third value.

26. The wireless communications apparatus of claim 25, wherein the maximum transmit power limit is substantially 16 dBm, and wherein the third value is substantially between 1 dB and 6 dB.

27. The wireless communications apparatus of claim 22, wherein the means for adjusting the transmit power level comprises means for adjusting the transmit power level in response to detecting a first number of correctly received frames has been received out of a second number of consecutive frames after the de-sense event is detected.

28. A computer program product comprising a non-transitory computer readable medium encoded thereon with instructions that when executed cause a wireless communications apparatus to perform a method of wireless communication, said method comprising:
detecting a de-sense event, wherein detecting the de-sense event comprises:
detecting a number of consecutive incorrectly received frames being equal to or greater than a first threshold, wherein a transmitter of the wireless communications apparatus is de-activated in response to detecting that the number of consecutive incorrectly received frames is equal to or greater than the first threshold; and
detecting that a change in a receive power level of a receiver of the wireless communications apparatus before and after the transmitter of the wireless communications apparatus is de-activated is greater than a second threshold;
adjusting the transmit power level of the transmitter of the wireless communications apparatus to a first transmit power level in response to detecting the de-sense event;
maintaining the transmit power level substantially at the first transmit power level for a first time interval in response to adjusting the transmit power level to the first transmit power level; and
gradually adjusting a transmit power level limit of the transmitter after the first time interval, at a rate, for a second time interval.

29. The computer program product of claim 28, wherein the first transmit power level substantially corresponds to the transmit power level a number of frames before the de-sense event.

30. The computer program product of claim 28, wherein the rate corresponds to increasing the transmit power level limit by an amount every select number of frames.

31. The computer program product of claim 30, wherein the amount is determined by dividing an upper transmit power limit subtracted from a first value by a second value.

32. The computer program product of claim 31, wherein the method further comprises initially determining the upper transmit power limit, in response to the detected de-sense event, based on a maximum of:
a maximum transmit power limit; or
a stored transmit power level before the de-sense event added to a third value.

33. The computer program product of claim 28, wherein adjusting the transmit power level comprises adjusting the transmit power level in response to detecting a first number of correctly received frames has been received out of a second number of consecutive frames after the de-sense event is detected.

* * * * *